No. 824,164. PATENTED JUNE 26, 1906.
J. W. WILLSON.
CHURN.
APPLICATION FILED DEC. 4, 1905
3 SHEETS—SHEET 1.
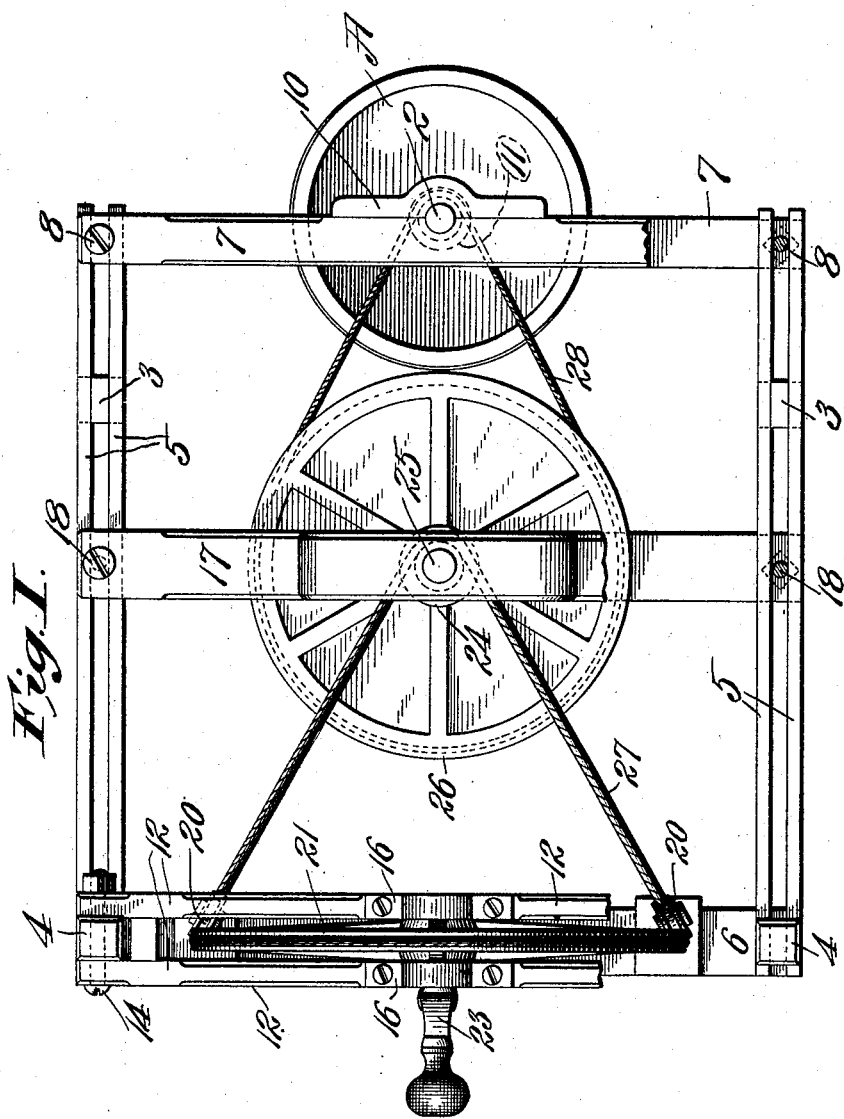

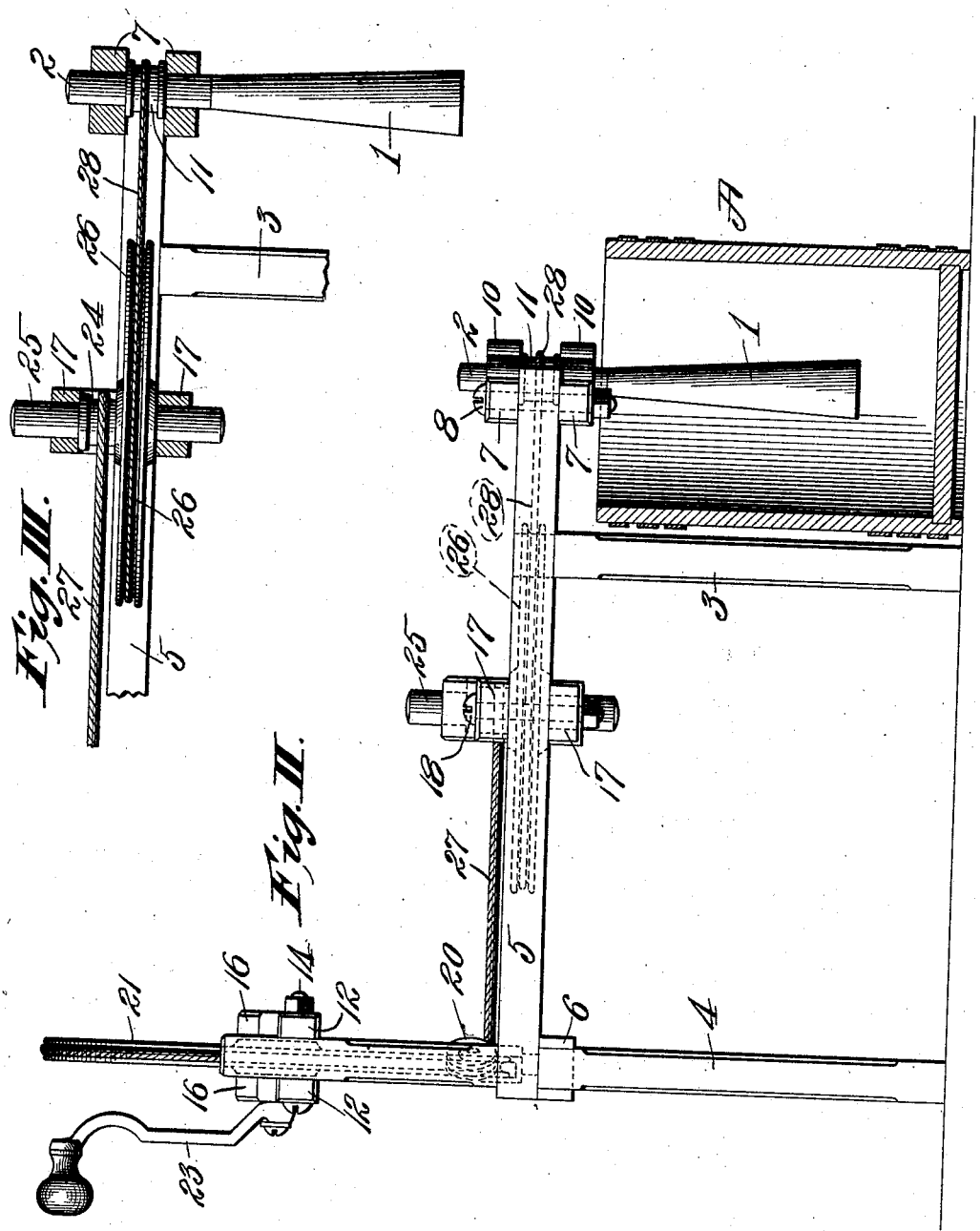

No. 824,164. PATENTED JUNE 26, 1906.
J. W. WILLSON.
CHURN.
APPLICATION FILED DEC. 4, 1905
3 SHEETS—SHEET 3.
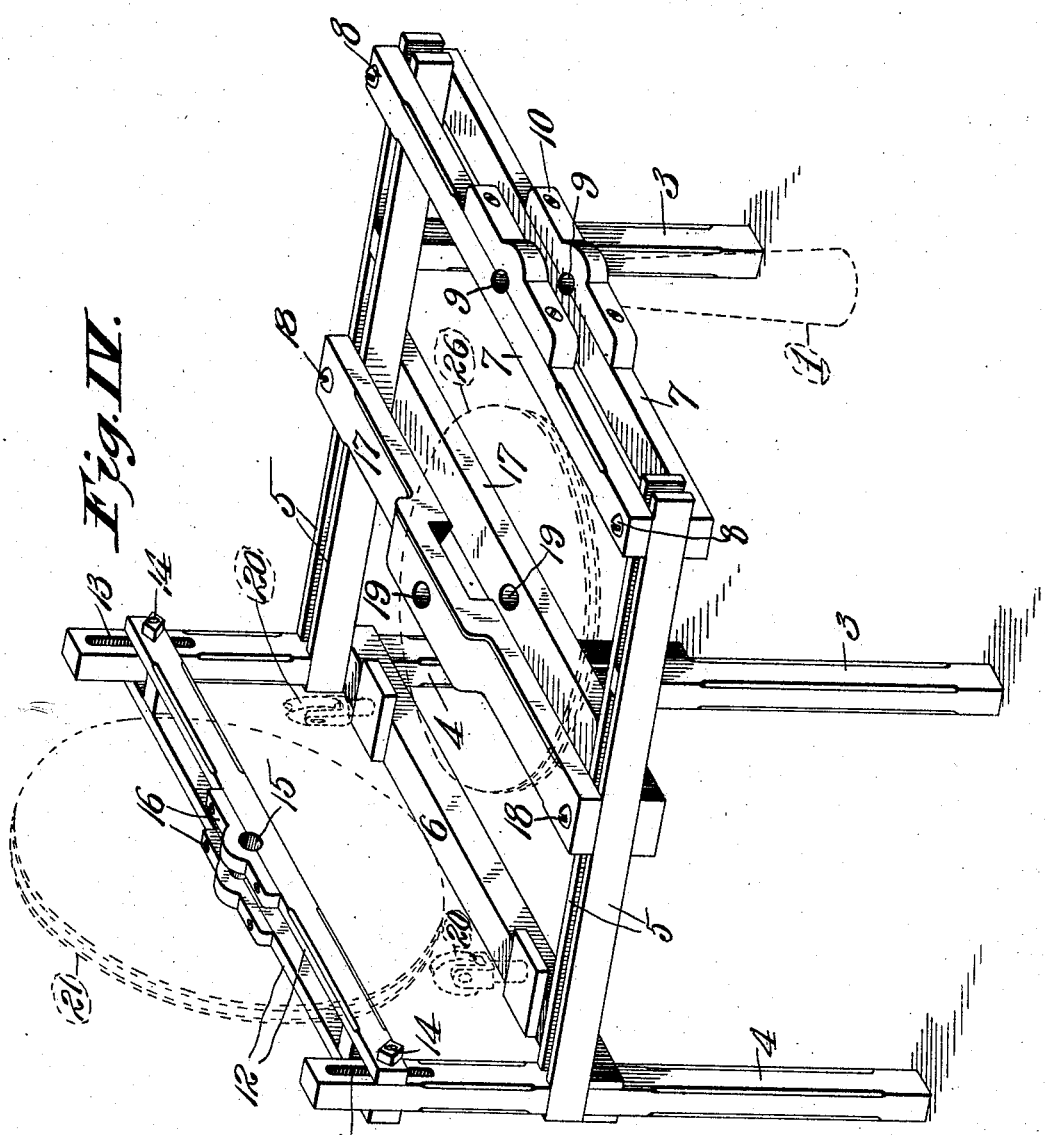
Witnesses:
Inventor:
J. W. Willson,
By Wright Bro.
Attys.

UNITED STATES PATENT OFFICE.

JOHN W. WILLSON, OF GRANITE CITY, ILLINOIS, ASSIGNOR OF ONE-HALF TO ELIAS MOTT, OF GRANITE CITY, ILLINOIS.

CHURN.

No. 824,164.　　　Specification of Letters Patent.　　　Patented June 26, 1906.

Application filed December 4, 1905. Serial No. 290,063.

*To all whom it may concern:*

Be it known that I, JOHN W. WILLSON a, citizen of the United States, residing in Granite City, in the county of Madison and State of Illinois, have invented certain new and useful Improvements in Churns, of which the following is a full, clear, and exact description, reference being had to the accompanying drawings, forming part of this specification.

My invention relates to churns; and it has particular reference to a novel form of agitator whereby cream may be more quickly and efficiently churned to produce butter than is possible in the use of many of the churns heretofore used.

My invention has further reference to the gearing by which the churn-dasher is operated and a gearing-supporting frame, including adjustable members, whereby members of the gearing may be shifted to secure the desired tension upon other of the gearing members.

Figure I is a top or plan view of my churn. Fig. II is a side elevation of the churn. Fig III is a view, partly in vertical section and partly in elevation, illustrating the churn-agitator and the gearing members most nearly associated therewith. Fig. IV is a perspective view of the frame of my churn.

1 designates an agitator, which is of conical form and the widened or base portion of which is at its bottom. The surface of this agitator is preferably smooth and free of projections. This agitator is designed to be operated in a vessel or receptacle of any ordinary description, such as a tub A. (See Fig. II.) The agitator 1 is provided with a shank 2, which is rotatably supported in a frame, to be hereinafter described, and to which power is applied for the purpose of imparting rotation to the agitator. The agitator is designed to be rotated in a vertical position, and due to its peculiar shape it operates during the churning action within the vessel A to constantly agitate the cream present in said vessel with a swirling motion, during which action the cream is projected upwardly in the vessel, due to the agitator being wider at its base than at any point above its base.

3 designates the forward legs of the gearing-supporting frame of my churn, and 4 represents the rear legs. The forward and rear legs are united by two pairs of side bars 5, spaced apart from each other and secured to the upper ends of said legs.

6 is a tie-bar connecting the two rear legs 4, to which it is permanently fastened.

7 designates a pair of front cross-bars adjustably fitted to the side bars 5, one of said cross-bars being located beneath the forward ends of the side bars and the other cross-bar being located above the forward ends of the side bars. The cross-bars are secured to the side bars for adjustment by clamping-bolts 8, that pass vertically through the cross-bars and through the spaces between the pairs of side bars. It will be seen that by this construction the forward cross-bars may be shifted forwardly or rearwardly relative to the side bars 5 to obtain any desired degree of adjustment. Each of the forward cross-bars is provided with a vertical opening 9, in which the shank 2 of the agitator 1 is rotatably fitted, said openings being preferably produced by forming recesses in the cross-bars and by applying to said bars cleats 10, containing recesses to register with those in the cross-bars. The shank of the agitator has fixed to it a pulley 11, (see Figs. II and III,) that is positioned between the cross-bars 7 and to which power is communicated in a manner to be hereinafter defined.

12 designates a pair of vertically-adjustable cross-bars uniting the upper ends of the rear legs 4, which extend above the main portions of the frame and are provided with vertical slots 13. The cross-bars 12 are spaced apart so that they embrace the upper ends of the legs 4, and they are upheld in adjusted position by clamp-bolts 14, which pass horizontally through the bars adjacent to their ends and through the slots 13. In each vertically-adjustable cross-bar is an aperture 15, said apertures being preferably produced by recessing the cross-bars and applying to them recessed cleats 16.

17 designates a pair of horizontally-adjustable central cross-bars that are movably fitted to the side bars 5 in positions corresponding to those occupied by the forward cross-bars 7. These central cross-bars have their ends fitted to the side bars 5 above and below said side bars, and they are adjustably held to the side bars by clamping-bolts 18, which pass through the central cross-bars and through the spaces between the side bars. In the center of each central cross-bar is a bearing-opening 19.

20 designates a pair of pulleys supported in vertical positions by the tie-bar 6, that connects the rear legs of the churn-frame.

21 designates a main drive-pulley, the shaft of which is mounted in the openings 15 of the vertically-adjustable cross-bars 12 and has applied thereto a crank 23.

24 is a horizontal driven pulley that is located between the central cross-bars 17 and is provided with a vertical shaft 25, that operates in the openings 19 in said cross-bars. The pulley 24 has rigidly fixed thereto an auxiliary pulley 26, preferably of larger diameter than said driven pulley 24.

27 designates a belt that operates upon the periphery of the drive-pulley 21, (said pulley being preferably grooved for the reception of the belt,) this belt passing from the drive-pulley to and under one of the pulleys 20 and therefrom to the driven pulley 24, from which it returns to the other pulley 20 and to the drive-pulley 21. It will be seen that upon rotation being imparted to the drive-pulley through the medium of the crank 23 power is transmitted from said drive-pulley through the belt 27 to drive the driven pulley 24 and also the auxiliary pulley 26.

28 is a belt that is fitted to the periphery of the auxiliary driven pulley 26 (said pulley being preferably grooved for the reception of said belt) and which extends from said pulley to the pulley 11, fixed to the shank of the agitator 1. This last-named belt serves to transmit power from the auxiliary driven pulley to the agitator-pulley, which latter pulley being of smaller diameter than the pulley from which power is transmitted has power applied thereto in a manner to produce a high speed of rotation of the pulley by which the agitator is driven, thereby causing the agitator to be very rapidly rotated in the vessel in which it operates.

I claim—

1. In a churn, the combination of supporting-legs, side bars supported by said legs, an agitator-supporting bar adjustably secured to said side bars, means for holding said bar in adjusted positions, an agitator supported by said adjustable bar, and gearing for driving said agitator, substantially as set forth.

2. In a churn, the combination of supporting-legs, horizontal side bars supported by said legs, forward horizontal cross-bars adjustably secured to said side bars, an agitator rotatably mounted in said cross-bars, rear horizontal cross-bars adjustably secured to said side bars, a pulley journaled in said rear cross-bars, a belt leading from said pulley to said agitator, and means for driving said pulley, substantially as set forth.

3. In a churn, the combination of supporting-legs, horizontal side bars supported by said legs, forward horizontal cross-bars adjustably secured to said side bars, an agitator rotatably mounted in said cross-bars, rear horizontal cross-bars adjustably secured to said side bars, a pulley journaled in said rear cross-bars, a belt leading from said pulley to said agitator, a second pulley fixed to said first-named pulley, vertically-adjustable bars secured to a pair of said posts, a pulley journaled in said last-named bars, and a belt connecting the two last-named pulleys, substantially as set forth.

JOHN W. WILLSON.

In presence of—
E. S. KNIGHT,
BLANCHE HOGAN.